United States Patent

Bauer et al.

Patent Number: 6,099,079
Date of Patent: Aug. 8, 2000

[54] BELT INTEGRAL SEAT OF A MOTOR VEHICLE WITH A RETRACTOR FOR THE SAFETY BELT AND A SENSOR STEERING THE RETRACTOR

[76] Inventors: Heinz Bauer, Hammerstr. 9, D-42699 Solingen; Burckhard Becker, Obenkatternberg 25, D-42655 Solingen; Ernst-Reiner Frohnhaus, Hammerstrasse 13, D-42699 Solingen, all of Germany

[21] Appl. No.: 09/060,492

[22] Filed: Apr. 15, 1998

[30] Foreign Application Priority Data

Apr. 28, 1997 [DE] Germany .......................... 197 17 689

[51] Int. Cl.⁷ .................................................. A62B 35/02
[52] U.S. Cl. ....................... 297/478; 296/68.1; 242/384.4
[58] Field of Search .................................. 297/477, 478; 242/384.4; 296/65.05, 65.08, 68.1; 280/807

[56] References Cited

U.S. PATENT DOCUMENTS

| | | | |
|---|---|---|---|
| 4,204,255 | 5/1980 | Cremer ............................... | 296/65.09 X |
| 4,610,480 | 9/1986 | Yamada et al. ................... | 242/384.4 X |
| 5,622,383 | 4/1997 | Kielwein et al. ................. | 242/384.4 X |
| 5,716,102 | 2/1998 | Ray et al. ............................... | 297/478 |
| 5,765,744 | 6/1998 | Maekawa et al. .................. | 297/478 X |
| 5,848,758 | 12/1998 | Ernst .................................... | 297/478 X |
| 5,882,084 | 3/1999 | Verellen et al. ......................... | 297/478 |

FOREIGN PATENT DOCUMENTS

| | | | |
|---|---|---|---|
| 2658747 | 6/1978 | Germany ............................. | 296/68.1 |
| 404201651 | 7/1992 | Japan .................................... | 280/807 |

*Primary Examiner*—Peter R. Brown
*Assistant Examiner*—David E. Allred

[57] ABSTRACT

The invention relates to a belt integral seat of a motor vehicle with a backrest, which includes a frame, a retractor, for the safety belt attached to the backrest and a sensor steering this retractor. The seat also contains a seat area, which is joined by a back rest joint with the back rest, and a seat frame, which comprises an adjustment device, with which at least the angle of the tilt of the seat area can be changed. The sensor is connected in a pivoted manner with the frame of the back rest around the swiveling axis and in the seat frame a mechanical device for the registration of the adjustment of the angle of the tilt is provided, which registers the angle of the tilt of the seat area in comparison to a state of reference and which is pivotally connected with the sensor by a flexible shaft.

14 Claims, 2 Drawing Sheets

BELT INTEGRAL SEAT OF A MOTOR VEHICLE WITH A RETRACTOR FOR THE SAFETY BELT AND A SENSOR STEERING THE RETRACTOR

FIELD OF THE INVENTION

The invention relates to a safety belt integral seat of a motor vehicle with a) a backrest, which comprises a frame, a retractor for the safety belt attached to the same and a sensor steering this retractor, b) a seat area, which is joined via a back rest joint with the back rest and c) a seat frame, which comprises an adjustment device, with which at least the angle of the tilt of the seat area can be changed.

DESCRIPTION OF THE PRIOR ART

Such a belt integral molded seat is known from the EP 749 867 A1. Above an upper cross piece of the back rest frame, a device for the safety belt guidance is provided, the safety belt extends from there to the front to the passenger and to the back within the back rest to a takeup unit, to which a retractor and a sensor steering this retractor is usually allocated. This sensor reacts to sufficiently high forces of acceleration, as they occur typically with delays of the motor vehicle caused by accidents. Such sensors are generally known, with the non-belt integral molded motor vehicle seats they were usually located in the side string piece of the motor vehicle. Sensors of such kind are also used for air bags. The retractor of the safety belt is set in action by the sensor, in such a way that the same tightens the belt. These interrelationships are known in the state of the art.

It is also known that the sensor must have a definite position to the vertical line, as it usually works with the forces of gravity or is released by them respectively. Typically, the sensor has a pendulum which is provided with sufficient pendulum forces, which is excursed sufficiently with strong forces of delay and acceleration in such a way that the necessary release for the retractor occurs. This demands the already mentioned vertical positioning of the sensor independent of the respective relative position of the part, in which the sensor is arranged, in the present case namely the back rest.

Electronic follow-up devices are known, which always place the sensor in the correct position. These are typically used. They have the effect that the sensor always has the correct position independent from the swiveling position of the back rest in relation to the seating area.

A problem occurs though with belt integral molded seats, whose seat frames permit an angle adjustment of the seat area. An angle adjustment of the backrest corresponds to the angle adjustment of the seat area, as both are rigidly connected via the back rest joint. At most times the seat area and the back rest are connected at the top of the seat frame.

When adjusting the seat frame, for example when operating the height adjustment or the adjustment device for the seat edge, for example the front edge of the seat, then the angle of tilt of the back rest is thereby always changed as well, expressed in other words the angle between the seat area and the back rest stays constant. But an adjustment of the seat frame leads to such large alterations of the angle in the back rest that the range of tolerance of the sensor is exceeded. Usually the range of tolerance of the sensor lies at a few degrees, for example plus/minus 1 to 2 degrees. If therefore a belt integral molded seat of the above mentioned kind is equipped with a height adjustment or an adjustment device in the area of the seat frame, then the danger exists that the sensor reaches an unacceptable inclined position and does not function properly anymore. This has a tremendous effect on the security of a passenger, who is held with the safety belt.

SUMMARY OF THE INVENTION

It is the objective of the invention to remove this disadvantage and departing from the known belt integral molded seat of the above mentioned kind to offer a solution for the fact that a belt integral molded seat can be provided with an adjustable seat frame without affecting the function of the sensor.

This objective is solved according to the characteristics of the above mentioned kind by a belt integral molded seat having a backrest, which comprises a frame, a retractor for the safety belt attached to the same and a sensor steering this retractor, and having a seat area, which is joined via a back rest joint with the back rest. The seat also has a seat frame, which comprises an adjustment device, with which at least an angle of the tilt of the seat area can be changed. According to the invention a mechanically operating device is provided in the seat frame, which permits the registration of the respective angle of the tilt of the upper area of the seat frame and by this the seat area or the back rest in relation to a reference position. The registered divergence is sent to the sensor via the flexible shaft. The sensor is therefore always swiveled in such a way that the alteration of the angle of the tilt, which might have occurred by an alteration in the seat frame, is compensated. That way operations of adjustment at the seat frame, which have an effect upon the angle of the tilt of the seat area, have no consequences on the function of the sensor. It rather stays in the position to the vertical line, which is necessary for its function and necessary within the range of tolerance.

Preferably the device for the registration of the angle of tilt is arranged at the upper part of the seat frame. The upper part is rigidly connected with the seat area. Thereby no alterations in the distance between the sensor and the device for the registration of the angle of tilt occur, but only alterations of the angle around the back rest joint. Hence the flexible shaft does not have to compensate any length alterations, but only the adjustment of the angle of the tilt of the back rest.

In a preferred embodiment, the mechanical device has an adjusting arm for the registration of the angle of tilt, which is arranged on one hand freely pivoted around the axis of the back rest joint and on the other hand comprises a carrier, which co-operates with a respective carrier part at a back swiveling post. According to the alteration of the angle of the swiveling post, the adjusting arm is pivoted with a respective carrier piece, whose swiveling position is registered on the sensor via the flexible shaft, which always keeps the correct angle adjustment within the range of tolerance.

That way it is possible to keep the position of the sensor within the reliable angle area with simple, mechanical means. An electric concept would be an alternative, as it is in use already to compensate the angle alterations of the back rest around the back rest joint. Such electronically working devices are tremendously expensive, mostly more expensive by the factor 10 than the mechanical device according to the invention. This is embodied in a relatively simple manner, it only needs very little parts. It takes advantage of the fact that that the angle, by which the sensor needs to be corrected each time, does not always have to be given in an exact manner, but has to lie only within the range of tolerance. Furthermore, the alterations of the angle of the seat area, which can actually be reached, are not immense in comparison to for example the horizontal line, so that the correction is much easier based on this reason. Especially with a parallelogram height adjustment, as it is known for example from the European patent application 445 528 A2, the position of the angle of the seat area changes within the adjusting area made possible by the height adjustment device in such a way, which can be compensated well enough by the mechanical device.

Furthermore, it is advantageous, to provide the carrier with a coupling piece, which is concentrically arranged to the axis of the back rest joint. An adapter, which comprises a coupling counter part, is arranged at the flexible shaft with torsional tension. The coupling piece and the coupling counter part can be connected with each other with torsional tension. That way, the flexible shaft can be provided together with the coupling counter part in or at the back rest and when assembling the motor vehicle seat, namely when inserting the back rest, the adapter can be mounted onto the coupling piece, especially it can be clipped onto it.

Based on experience it has proven to be a suitable placement to arrange the carrier of the adjusting arm explicitly closer to the swiveling joint of the back swiveling post than to the swiveling axis of the back rest joint. Especially a location of contact of carrier and carrier piece in a distance of about ⅙ of the total length of the adjusting arm of the swiveling joint of the back swiveling post has proven to be advantageous. By this on one hand a low actual movement of the adjusting arm is given, which again has the advantage that carrier and carrier piece only perform a small relative movement towards each other. A carrier embodied as a long hole can therefore be relatively short.

A tube of synthetic material has proven to be especially suitable for the flexible shaft. Hereby normal relatively thin tubes of synthetic material can be used. Also speedometer drives, flexible rods of synthetic material, but with torsional strength, as well as wires made of synthetic material or metal can be used. As the sensor only has a relatively small material mass, the forces to be transferred are relatively small. It has to be taken into account, however, that the angle position of the sensor is not only determined by the flexible shaft, but also carried. The flexible shaft has to be embodied accordingly, it is necessary that it can carry the sensor in its angle position in the practical operation. The actual mechanical attachment of the sensor occurs via its swiveling axis, with which it is connected with the frame of the back rest.

It has proven to be especially advantageous, to realize the adjusting arm and the adapter as of lightweighted material, if possible, especially as parts made of synthetic material. Especially injection molding parts of synthetic material are taken into account.

Further advantages and characteristics of the invention derive from the other claims as well as the following description of a non-restrictive embodiment of the invention, which is illustrated further with regard to the drawing.

DESCRIPTION OF THE PREFERRED EMBODIMENTS

Figure 1:
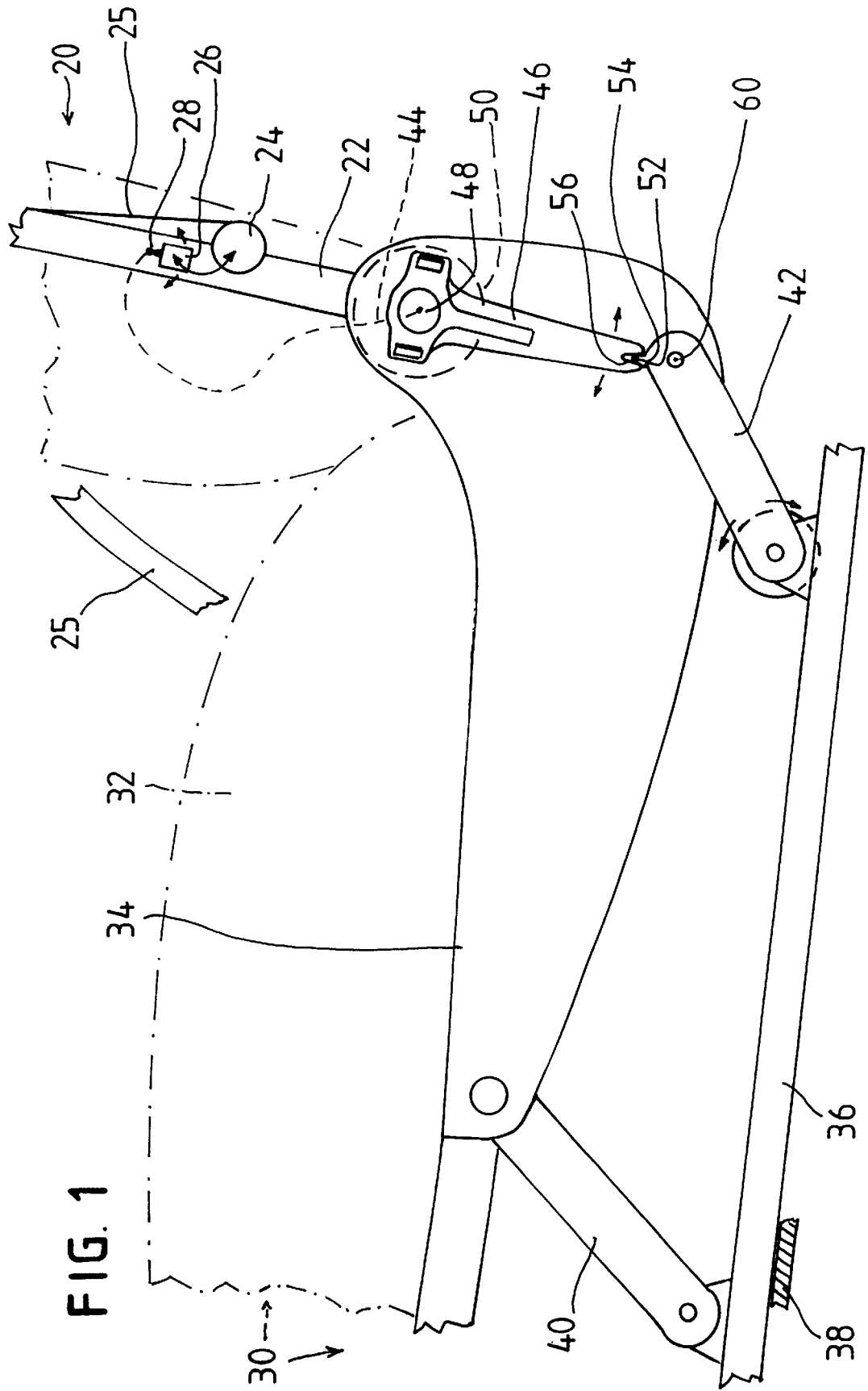
FIG. 1: a side view of the parts of a belt integral molded seat, which are important for the invention

The belt integral molded seat has a back rest 20 in the manner known already, which comprises a frame 22, a retractor or a belt take-up 24 attached to this frame 22 and a sensor 26 controlling this retractor 24. The sensor 26 is connected with the frame pivotably around an axis 28. It can be swiveled in the sense of a dual arrow to the left and to the right.

Further, a seat area 30 with an upholstery body 32 for the seat surface are part of the belt integral molded seat.

Finally a seat support is provided, to which belong a seat support 34 and a longitudinal adjustment device 36 consisting of two rail parts, of which the lower rails are in each case connected with an understructure of the body 38 of the motor vehicle. Furthermore, two parallelogram arms respectively swiveling posts 40, 42, which are hinged below at the bottom with the longitudinal adjustment device 36 and at their upper hinge points with the seat carrier 34, belong to the seat frame. The two swiveling posts 40, 42 are the essential parts of an adjustment device, the locking means for this adjustment device are not illustrated in the drawing for reason of simplicity. In the manner known already tooth segments with the respective blocking parts or lateral runout link mountings can be inserted at this point. It is essentially the height of the seat area 30 that can be changed by the adjustment device, but also its angle of the tilt. Additionally the position of the seat area 30 is changed in the direction of the rails of the longitudinal adjustment device 36, namely prelocated or relocated.

A mechanical device for the registration of the angle of the tilt is provided in the seat frame. It permits the registration of the angle of tilt in the seat area 30 opposed to the reference position illustrated in FIG. 1. Based on the parallelogram kinematics in the illustrated embodiment the angle of tilt adjustment is low however, but based on the different lengths of the swiveling posts 40, 42 it exists and lies in a range above the limits of tolerance of the sensor 26. The respectively registered turning state is transferred via the flexible shaft 44 from the device to the sensor 26. The flexible shaft directly effects the sensor 26, for example on its axis 28. By turning of the flexible shaft 44 the sensor 26 is turned around the axis 28 according to the two arrows. The flexible shaft 44 is connected with torsional strength with the sensor 26 as well as with an adjusting part of the device for the registration of the angle.

In the illustrated embodiment the device for the registration of the angle of tilt has an adjusting arm 46, which can be freely pivoted around a swiveling axis 48 of a back rest joint 50. It essentially extends from this hinge point downwards, namely to the vicinity of the upper area of the back parallelogram arm 42. The same has a nose 52 extending towards it, onto which a carrier piece 54 in the shape of a short bolt projects crosswise to the plane of projection. It is in gear with a carrier 56 in the shape of a long hole, which is embodied at the lower free end of the adjusting arm 46.

Based on the combined effect of the carrier piece 54 and the carrier 56 the position of the angle of the adjusting arm 46 is changed, if the back swiveling post 42 is pivoted in accordance with the dual arrow, which is allocated to its lower hinge point.

Figure 2:
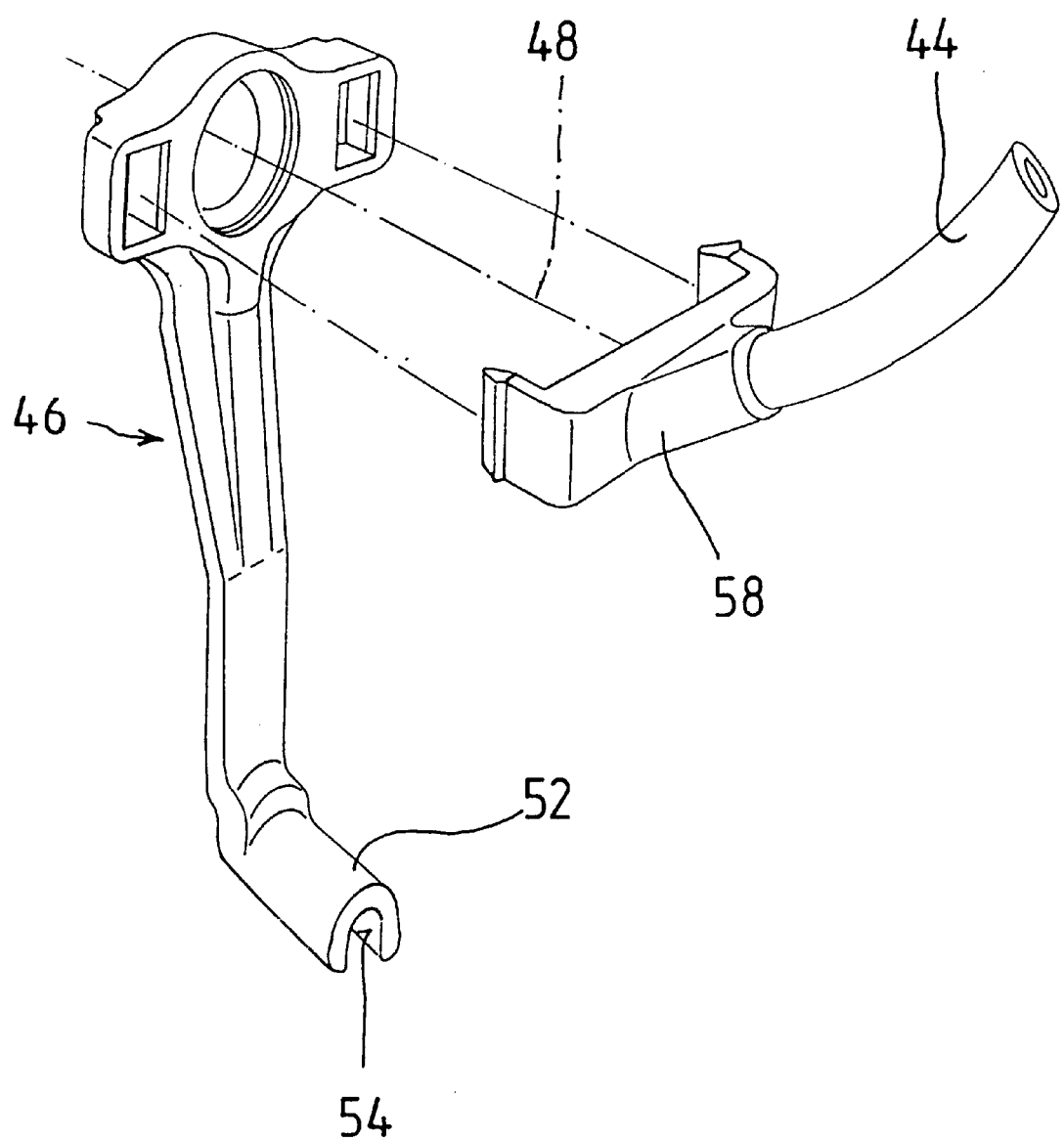
FIG. 2: a perspective illustration in the shape of an assembling picture of an adjusting arm, of an adapter and of a flexible shaft, which is embodied as a tube of synthetic material.

In a concentric manner to its bearing axis 48 around the back rest joint, the adjusting arm 46 has two recesses, into which projections of an adapter 58, which are shaped accordingly, engage, FIG. 2 illustrates the state of adjusting arm 46 and the adapter 58 when assembled. The adapter 58 is connected with the flexible shaft 44. In the embodiment according to FIG. 1 the flexible shaft 44 and its adapter 58 are allocated to the back rest 20, while the adjusting arm 46 is allocated to the seat frame. The mechanical connection for the induction regulation is produced by the connection of the adapter 58 and the adjusting arm 46. That way the assembly of the back rest 20 can be finished, for example it can also be upholstered, and only then assembled onto the seat frame. During this assembly, the mechanical connection between the adapter 58 and the adjusting arm 46 has to be produced among others.

The two windows at the upper area of the adjusting arm 46 represent a coupling piece, the free ends at the adapter 58, which are equipped with snap-on projections and restraint areas, represent a coupling counter-piece. Both can be connected with each other with torsional strength.

As can be seen from FIG. 1, the distance between an upper articulated axis 60 of the back swiveling post 42 and the carrier 56 amounts up to about 17% of the distance between this upper articulated axis 60 and the axis 48 of the back rest joint. Furthermore, the back swiveling post 42, with regard to the distance of its hinge points, and the already mentioned distance between the upper articulated axis 60 and the axis 48, amounts to about the same length. Altogether, a gear reduction of about 1 to 20 is achieved between a turning movement of the swiveling post 40 around its upper articulated axis 60 and the turning movement of the adjusting arm 46 around its axis, namely the axis 48.

In the embodiment according to FIG. 2, the flexible shaft 44 is embodied as a tube made of synthetic material. The same can also be embodied in another manner, as long as it transfers the turning movement and as long as it is sufficiently flexible, as desired for the purpose of application. Within the seat frame and especially within the back rest 20, the flexible shaft can be covered in a suitable manner by a protective covering, which prevents a direct friction between one part for example the back rest and the flexible shaft 44, but permits a free turning movement between the protective covering and the flexible shaft 44.

What is claimed is:

1. A safety belt integral seat of a motor vehicle with a backrest, said backrest comprising a backrest frame, a retractor for a safety belt attached to the frame and a sensor controlling pay-out on said retractor said seat further comprising a seat area joined by means of a backrest joint with said backrest, said seat area further comprising a seat frame, said seat frame comprising an adjustment device that changes an angle of tilt of the seat area relative to said motor vehicle, the improvement comprising said sensor being pivotally connected with said backrest frame around a swivelling axis and a mechanical device comprising an adjusting arm rotatably connected to said frames and rotated by a cog of the adjustment device for a registration of an adjustment of said angle of tilt is provided, said adjustment arm registers said angle of tilt of said seat area in comparison to a state of reference, said mechanical device is mechanically attached to said sensor at said swivelling axis of said sensor, so that said mechanical device carries said sensor in an angular position of said sensor which angular position is dependent on and compensates for a respective relative position of said angle of tilt of said seat frame.

2. The belt integral seat according to claim 1 wherein the seat frame comprises a back swiveling post and wherein the adjusting arm having two ends, wherein one end is arranged in a freely pivoted manner around an axis of the back rest joint, and the other end comprises a carrier that is movably connected with said cog in the form of a carrier part which is carried by swiveling post.

3. The belt integral seat according to claim 2 said swiveling post further comprising a swiveling joint, wherein at the end of said swiveling post that is distal to said swiveling joint, said carrier surrounds a long hole and wherein said carrier part has a projection that is in gear with the long hole.

4. The belt integral seat according to claim 2 wherein said adjusting arm comprises a coupling piece, said coupling piece being concentrically arranged to the axis of said back rest joint, said seat further comprising an adapter said adapter being connected with said mechanical device comprising a coupling counter part, said counter part being centrically arranged to the axis of rotation of said mechanical device, said coupling piece and said counter coupling piece being torsionally connected with each other.

5. The seat belt integral seat according to claim 4 wherein said coupling piece and said counter coupling piece constitute a plug-in coupling.

6. The belt integral seat according to claim 2 further comprising an upper swiveling joint wherein said carrier is arranged closer to said upper swiveling joint of said back swiveling post than to the swiveling axis of said back rest joint.

7. The belt integral seat according to claim 6, wherein the swiveling axis of said sensor extends parallel to the swiveling axis of said back rest joint.

8. The seat belt integral seat according to claim 6 wherein the distance between the articulated axis of said back swiveling post and said carrier is 5 to 30% of the total length of the carrier.

9. The seat belt integral seat according to claim 8 wherein the distance between the articulated axis of said back swiveling post and the said carrier is 10 to 20% of the total length of the carrier.

10. The belt integral seat according to claim 2 wherein in an interim position of the adjustment device of the seat frame said adjusting arm is located on a connecting line, said line extending through said axis of said back rest joint and said articulated axis of said back swiveling post.

11. The belt integral seat according to claim 1 wherein said mechanical device is a tube of synthetic material.

12. The belt integral seat according to claim 1 wherein said adjusting arm and said adapter are made of synthetic material.

13. The seat belt integral seat according to claim 12 wherein said adjusting arm and said adapter are injection molded.

14. The seat belt integral seat according to claim 1 wherein said mechanical sensor part is a pendulum.

* * * * *